May 3, 1932.   E. K. KEPPLER   1,856,391
LOCKING DEVICE
Original Filed Aug. 24, 1929
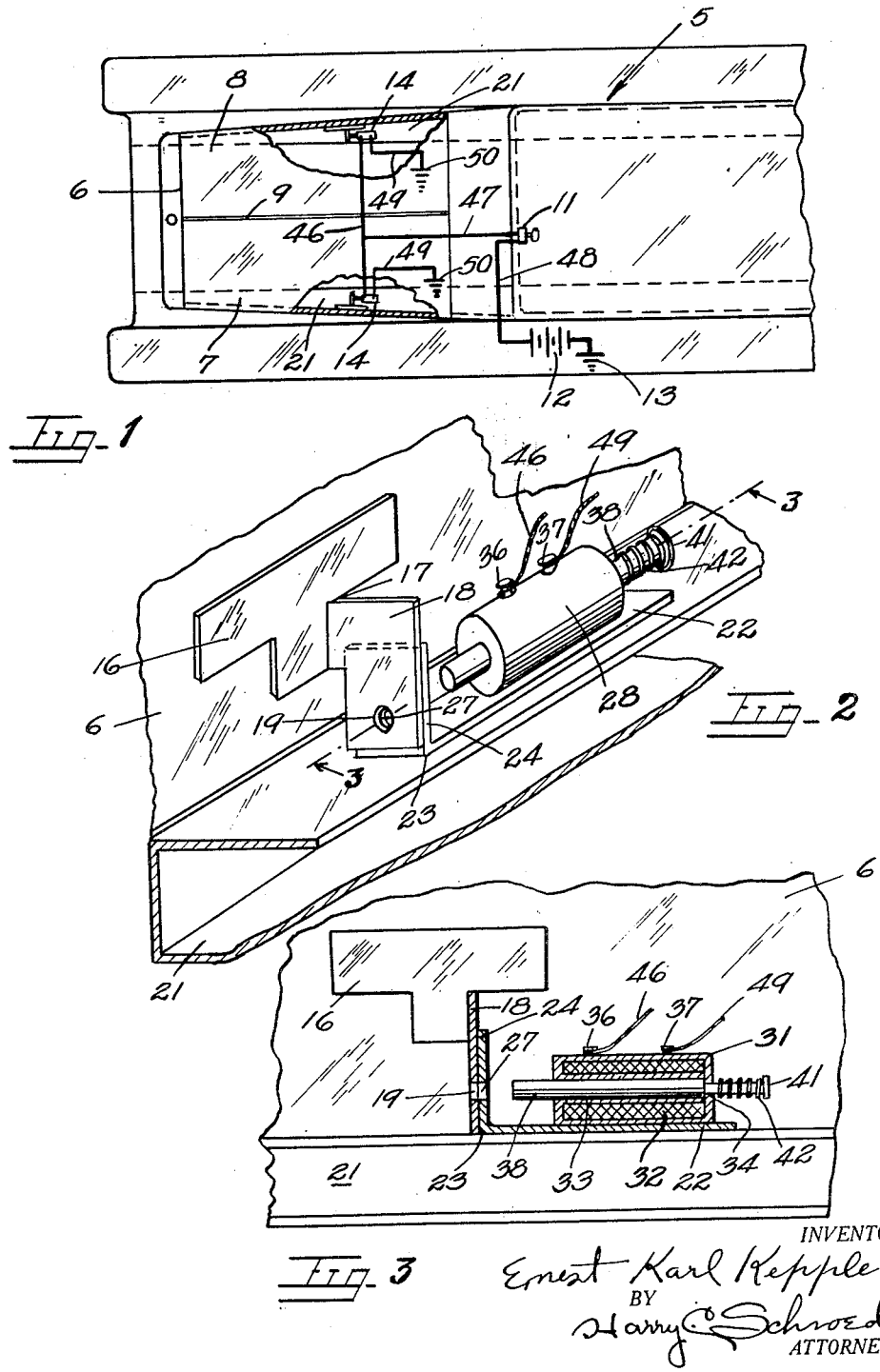
INVENTOR.
Ernest Karl Keppler
BY
Harry C. Schroeder
ATTORNEY.

Patented May 3, 1932

1,856,391

UNITED STATES PATENT OFFICE

ERNEST KARL KEPPLER, OF OAKLAND, CALIFORNIA

LOCKING DEVICE

Application filed August 24, 1929, Serial No. 388,051. Renewed October 6, 1931.

The invention forming the subject matter of this application relates generally to locking devices for automobiles and particularly to a device for locking the hood of the automobile in closed position.

An object of the invention is to provide a locking device for locking the hood of an automobile in closed position wherein said device is electrically connected to the ignition circuit of the automobile and is actuated thereby.

A further object of the invention is to provide a locking device for automobile hoods which includes an electrically actuated locking element for engaging said hood, wherein said element is connected in circuit through the ignition switch of the automobile in such a manner as to be urged into operative position when said ignition switch is turned "off" and becomes inoperative when said ignition switch is turned "on."

Another object of the invention is to provide a locking device of the character set forth which is highly useful and simple in construction. Convenience of arrangement, lightness and comparative inexpensive of manufacture are further objects which have been borne in mind in the production and development of the invention.

With the foregoing and other objects in view, which will be made manifest in the following detailed description and specifically pointed out in the appended claims, reference is had to the accompanying drawings for the illustrative embodiment of the invention wherein:

Fig. 1 is a diagrammatic plan view of the locking device as attached to an automobile and showing the wiring connections.

Fig. 2 is an enlarged perspective view of the locking device showing portions of the automobile frame and hood.

Fig. 3 is a longitudinal sectional view of the locking device taken on the line 3—3 of Fig. 2.

Referring to the accompanying drawings wherein similar reference characters designate similar parts thruout, the various figures described above adequately illustrate my invention and the following detailed description is commensurate with the above mentioned drawings in enabling an artisan to construct and assemble the constituent parts of the same.

In carrying out my invention I make use of an automobile designated by the numeral 5, having a hood 6, consisting of two sections 7 and 8 hinged to each other as at 9. The automobile also includes the usual ignition switch 11, mounted on the instrument board thereof and a battery indicated in diagram at 12, which battery is grounded to the frame of the vehicle at 13.

Means are provided for locking the sections 7 and 8 of the hood 6 to the frame of the automobile 5 in such a manner as to prevent unauthorized persons from opening said hood when the automobile is left unattended. Said means comprises a pair of locking devices indicated as an entirety by the numeral 14, there being one of the devices 14 provided for each of the hood sections 7 and 8. As each of the devices 14 are identical in construction a description of one of the said devices will be sufficient. The device 14 comprises a bracket 16 which is secured to the inside surface of each of the sections 7 and 8 adjacent the lower edge thereof, in any suitable manner and preferably by welding. The bracket 16 consists of a strip of sheet metal which is bent away from the hood 6 substantially at right angles as at 17 to form a projection 18. The projection 18 is provided with a centrally positioned circular opening 19.

Mounted on the frame 21 forming a part of the automobile is another bracket 22 preferably secured to the frame by welding. The bracket 22 also consists of a strip of sheet metal having one end thereof bent upwardly substantially at right angles as at 23 forming a projection 24 substantially similar in size and shape to the projection 18. The bracket 22 is positioned on the frame 21 in such a manner that the projection 24 lies adjacent to, and in face to face relation with, the projection 18 and is provided with a circular opening 27 which aligns with the aperture 19 in the projection 18 in a manner clearly shown in Fig. 3.

Mounted on the horizontal portion of the bracket 22 and suitably secured thereto is a solenoid 28 consisting of a metal casing 31, conducting wire winding 32 and a bore 33 which extends thru said casing and terminates at one end in a reduced opening 34. Binding posts 36 and 37 are connected to the ends of said wire winding. Slidably disposed in the bore 33 is a bolt 38, provided with a reduced end which extends thru the reduced opening 34 and terminates in a head 41. A compression spring 42 surrounds the reduced end of the bolt 38 and is disposed between the head 41 thereof and the solenoid casing 31 for normally holding said bolt in withdrawn position.

It will be noted that the solenoid 28 is mounted in such a manner that the bolt 38 thereof is in central alignment with the aligned openings 19 and 27 in the brackets 16 and 22 respectively. In this manner when the solenoid 28 is energized the bolt will move outwardly and extend thru the openings 19 and 27, locking the bracket 16 to the bracket 22 and thereby locking the automobile hood 6 to the frame of the automobile. When the solenoid 28 is deenergized the spring 42 withdraws the bolt 38 from engagement with the brackets 19 and 22.

It will be realized that the solenoid 28 may be connected in circuit with the battery 12 of the automobile in any suitable manner and may be controlled by any desired type of switch. However, as the purpose of the device is to lock the automobile hood when the car is unattended, and as it is possible for the average person to forget to turn the switch for operating the locking devices I connect the solenoids 28 to the ignition switch 11 of the vehicle in such a manner that when the ignition switch is turned "off" to stop the motor of the automobile it connects the solenoid to the battery energizing the same and thereby locking the hood 6. As most ignition switches are operated by a key which cannot be removed from the switch until the same is turned "off", it will be clearly seen that in leaving the automobile the driver will turn the ignition "off" to remove the key and in doing so will automatically lock the hood.

Viewing Fig. 1 a wire 46 connects the binding posts 36, of each of the two solenoids 28 to each other and a wire 47 connects the wire 46 to a terminal of the ignition switch 11. A wire 48 forms the usual connection between the ignition switch 11 and the battery 12. A wire 49 is connected to each of the binding posts 37 and is grounded as at 50 thereby completing a circuit to the battery 12 thru the ignition switch 11.

In this specification, and the annexed drawings, the invention is illustrated in the form considered to be the best but it is to be understood that the invention is not limited to such form, because it may be embodied in other forms; and it is also to be understood that in and by the claims following the description, it is desired to cover the invention in whatsoever form it may be embodied.

I claim:

1. A locking device for automobile hoods comprising a right angle bracket extending inwardly from said hood and affixed thereto, a cooperating right angle bracket affixed to the frame, registrable apertures in said brackets and a plunger operated by electrical energy adapted to cooperate with said apertures, and resilient means for withdrawing said plunger on interruption of the electric circuit.

2. A locking device for an automobile hood comprising a right angle bracket affixed to and extending inwardly from said hood and having an aperture therethrough, a right angle bracket affixed to the frame of said automobile and having an aperture adapted to register with said first named aperture when said hood is closed, and a bolt comprising an extension of the core of a solenoid, said bolt being retracted by resilient means, on interruption of an electrical circuit to the solenoid.

3. A locking device for an automotive vehicle hood, comprising a right angle bracket affixed to the inner surface of a hood, a cooperating right angle bracket affixed to the top of the frame of said automotive vehicle, apertures in said right angle brackets adapted to be in registry when said hood is closed, a bolt adapted to cooperate with said apertures, said bolt comprising the movable core of a solenoid, said core being resiliently retracted, and a solenoid provided with a single winding and connected in circuit with an ignition switch, and a source of electrical potential for said circuit.

4. A locking device for an automatic vehicle hood, comprising an inwardly extending bracket affixed to said hood adjacent the bottom thereof, an L shaped bracket affixed to the top of the frame of said vehicle and having one leg thereof extending upwardly in cooperative relation to said inwardly extending bracket when said hood is closed, registerable apertures in said brackets, a solenoid mounted on said L shaped bracket, a movable core in said solenoid adapted to cooperate with said apertures, resilient means for retracting said core on interruption of a circuit to said solenoid, an electrical circuit for said solenoid, said circuit being closed coincidently with the opening of the low tension ignition circuit of said automotive vehicle.

In testimony whereof I affix my signature.

ERNEST KARL KEPPLER.